(12) United States Patent
Rumpf et al.

(10) Patent No.: US 10,384,271 B2
(45) Date of Patent: Aug. 20, 2019

(54) TOOL HOLDER FOR AN INDEXABLE CUTTING INSERT AND CUTTING TOOL

(71) Applicant: Kennametal Inc., Latrobe, PA (US)

(72) Inventors: Markus Rumpf, Fürth (DE);
Maximilian Toepfl, Siegenhofen (DE)

( * ) Notice: Subject to any disclaimer, the term of this patent is extended or adjusted under 35 U.S.C. 154(b) by 0 days.

(21) Appl. No.: 15/703,407

(22) Filed: Sep. 13, 2017

(65) Prior Publication Data
US 2018/0085832 A1  Mar. 29, 2018

(30) Foreign Application Priority Data
Sep. 13, 2016  (DE) .......................... 10 2016 117 198

(51) Int. Cl.
*B23C 5/22*  (2006.01)
*B23B 27/16*  (2006.01)

(52) U.S. Cl.
CPC ........ *B23B 27/164* (2013.01); *B23B 27/1662* (2013.01); *B23B 2200/0471* (2013.01); *B23B 2205/04* (2013.01)

(58) Field of Classification Search
CPC ............ B23B 29/02; B23B 2200/0471; B23B 2205/04; B23B 27/164; B23B 27/1662; B23B 27/1614
See application file for complete search history.

(56) References Cited

U.S. PATENT DOCUMENTS

| | | | | |
|---|---|---|---|---|
| 3,188,717 A | * | 6/1965 | Heinlein | B23B 27/16 407/104 |
| 3,192,603 A | * | 7/1965 | Greenleaf | B23B 27/1659 407/101 |
| 3,341,923 A | * | 9/1967 | Kelm | B23B 27/1662 407/104 |
| 3,393,435 A | * | 7/1968 | Viellet | B23B 27/1662 407/105 |
| 3,469,296 A | * | 9/1969 | Reeve | B23B 27/1662 407/105 |
| 3,491,421 A | * | 1/1970 | Holloway | B23B 27/1662 407/105 |
| 3,611,527 A | * | 10/1971 | Hudson | B23B 27/1662 407/104 |
| 3,787,941 A | * | 1/1974 | Novkov | B23B 27/1622 407/105 |

(Continued)

FOREIGN PATENT DOCUMENTS

JP  2000000702 A  *  1/2000

*Primary Examiner* — Sara Addisu
(74) *Attorney, Agent, or Firm* — Larry R. Meenan

(57) ABSTRACT

A tool holder (12) for an indexable cutting insert (13) is disclosed, comprising a tool holder base body (15), having a receiving pocket (20) for receiving an indexable cutting insert (13) and a fastening pin (17). The fastening pin (17) can assume a mounting position and a clamping position. In the mounting position, the fastening pin (17) can be positioned in a fastening opening (14) of an indexable cutting insert (13). In the clamping position, an indexable cutting insert (13) can be fixed in the receiving pocket (20) by means of the fastening pin (17). The fastening pin (17) is arranged on a fastening slide (16), displaceably arranged in the tool holder base body (15). Furthermore, a cutting tool (10) is disclosed, having a tool holder (12) and an indexable cutting insert (13).

15 Claims, 4 Drawing Sheets

(56) References Cited

U.S. PATENT DOCUMENTS

Figure 1:
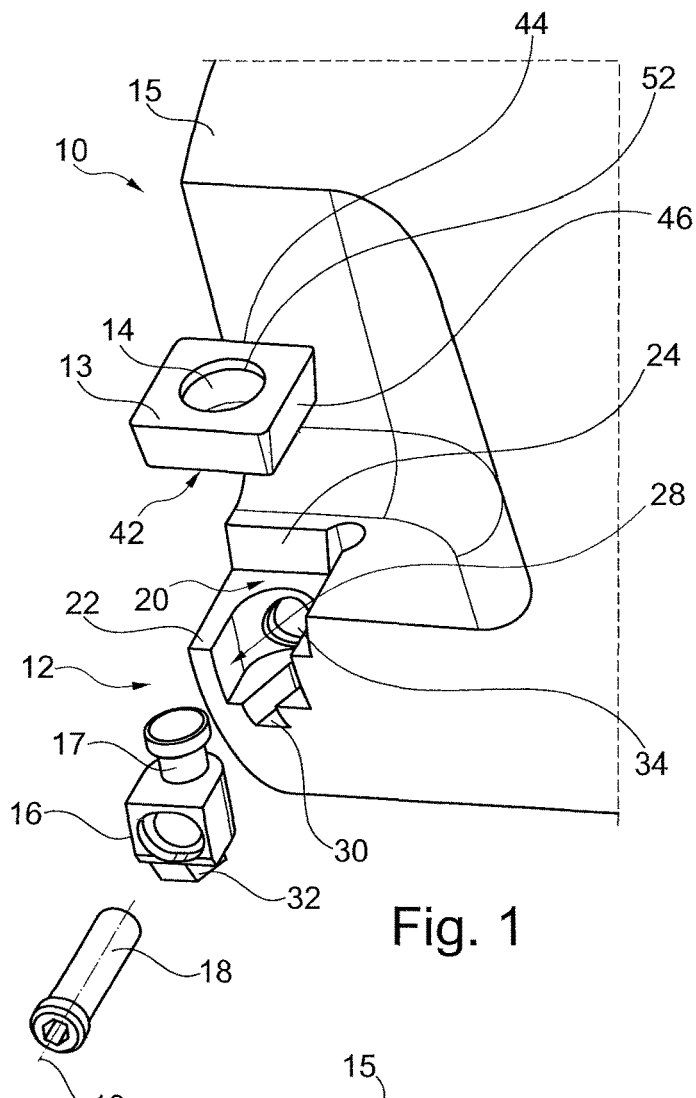

| | | | | |
|---|---|---|---|---|
| 3,965,553 A * | 6/1976 | Faber | | B23B 27/1662 407/104 |
| 3,997,951 A * | 12/1976 | Williscraft | | B23B 27/1677 407/105 |
| 4,044,440 A * | 8/1977 | Stier | | B23B 27/1662 407/105 |
| 4,244,666 A | 1/1981 | Erickson | | |
| 4,264,245 A * | 4/1981 | Lindsay | | B23C 5/2226 407/105 |
| RE31,292 E * | 6/1983 | Erickson | | B23B 27/1662 403/374.4 |
| 4,427,322 A * | 1/1984 | Kroll | | B23B 27/1662 407/105 |
| 4,470,732 A * | 9/1984 | Lindsay | | B23B 27/1662 407/104 |
| 4,487,533 A * | 12/1984 | Wermeister | | B23B 27/1662 407/105 |
| 4,533,283 A | 8/1985 | Satran | | |
| 4,583,886 A * | 4/1986 | Drescher | | B23B 27/00 407/104 |
| 4,938,638 A * | 7/1990 | Hessman | | B23C 5/2441 407/38 |
| 5,035,544 A * | 7/1991 | Ikenaga | | B23B 27/1677 407/105 |
| 6,155,754 A * | 12/2000 | Jonsson | | B23B 27/1622 407/103 |
| 6,158,928 A * | 12/2000 | Hecht | | B23B 27/1622 407/102 |
| 7,347,650 B2 * | 3/2008 | Tipu | | B23B 27/1662 407/101 |
| 9,089,910 B2 * | 7/2015 | Hecht | | B23C 5/2221 |
| 9,103,418 B2 * | 8/2015 | Hecht | | B23B 27/1622 |
| 9,868,157 B2 * | 1/2018 | Choi | | B23B 27/1662 |
| 10,105,760 B2 * | 10/2018 | Joo | | B23B 27/1662 |
| 2002/0172568 A1 * | 11/2002 | Shiraiwa | | B23B 27/1662 407/102 |
| 2003/0031518 A1 * | 2/2003 | Hellstrom | | B23B 27/1662 407/102 |
| 2003/0031519 A1 | 2/2003 | Hecht | | |
| 2006/0291965 A1 * | 12/2006 | Erickson | | B23B 27/1662 407/102 |
| 2008/0152441 A1 * | 6/2008 | Andersson | | B23B 27/065 407/103 |
| 2011/0211923 A1 * | 9/2011 | Yoffe | | B23B 27/1662 407/110 |
| 2011/0274507 A1 * | 11/2011 | Park | | B23B 27/1662 407/104 |
| 2012/0213600 A1 * | 8/2012 | Hecht | | B23B 27/06 407/102 |
| 2013/0142579 A1 * | 6/2013 | Saji | | B23B 27/1622 407/77 |
| 2013/0279997 A1 * | 10/2013 | Hecht | | B23B 27/045 407/105 |
| 2014/0334889 A1 * | 11/2014 | Hirukawa | | B23B 27/1622 407/66 |
| 2015/0231705 A1 * | 8/2015 | Sashin | | B23B 27/1696 407/89 |
| 2016/0023280 A1 * | 1/2016 | Athad | | B23B 27/04 407/106 |
| 2018/0015549 A1 * | 1/2018 | Harif | | B23B 27/1662 |

* cited by examiner

TOOL HOLDER FOR AN INDEXABLE CUTTING INSERT AND CUTTING TOOL

The present application claims priority pursuant to 35 U.S.C. § 119(a) to German Patent Application Number 10 2016 117 198 filed Sep. 13, 2016 which is hereby incorporated by reference in its entirety.

The invention relates to a tool holder for an indexable cutting insert, having a tool holder base body, in which a receiving pocket, comprising a base surface and a bearing structure, is arranged for receiving an indexable cutting insert, and having a fastening pin protruding from the base surface and capable of assuming a mounting position and a clamping position, wherein, in the mounting position, the fastening pin may be positioned in a fastening opening of an indexable cutting insert and, in the clamping position, an indexable cutting insert may be affixed in the receiving pocket by means of the fastening pin.

In addition, the invention relates to a cutting tool, having a tool holder of the aforementioned type, and a indexable cutting insert, having a indexable cutting insert base surface and an indexable cutting insert side surface.

Such tool holders and cutting tools are generally known from the prior art. Usually, the insert is positioned in the receiving pocket of the tool holder by being placed onto the base surface and placed against the bearing structure. Thereafter, the indexable cutting insert is affixed in the receiving pocket by means of a bolt which passes through a central through-hole in the indexable cutting insert. A tapped hole is provided in the base surface for this purpose.

A disadvantage of this classical design of tool holders and cutting tools is that the bolt is subjected to the forces and vibrations introduced into the cutting tool via the indexable cutting insert. This is the case, in particular, during the machining process. Under certain circumstances, the bolt, and thus the indexable cutting insert, may then be released from the tool holder. In addition, when the tool holders equipped with indexable cutting inserts are stored in a magazine in which they are arranged in vertical rows, it is furthermore disadvantageous that the bolt for fastening the indexable cutting insert is generally accessible only from above. A cutting tool must then be removed from the magazine in order to exchange the associated indexable cutting insert.

Numerous alternatives to this classic design are known.

U.S. Pat. No. 4,533,283 shows a tool holder and a cutting tool in which an indexable cutting insert is positioned by means of a pin projecting centrally from a base surface. The indexable cutting insert is then clamped at two of its side surfaces positioned at an angle to one other, and thus positioned in the tool holder.

US 2013/0279997 A1 likewise shows a tool holder and a cutting tool having such a tool holder. A tiltable pin protrudes from a base surface of a receiving pocket for an indexable cutting insert and engages into a fastening opening of the indexable cutting insert. By tilting this pin, the indexable cutting insert is placed with its side surfaces against a bearing structure having two bearing surfaces. The side surfaces of the indexable cutting insert and the bearing surfaces have a dovetail geometry, so that a positive fit is produced by placing the indexable cutting insert against the bearing structure, and the indexable cutting insert is held in the tool holder.

Another tool holder and a cutting tool are known from US 2003/0031519 A1. The tool holder comprises a pin which protrudes from a base surface of a receiving pocket and which can be tilted for fastening the indexable cutting insert to the tool holder. For this purpose, the pin engages in a central through-hole of the indexable cutting insert and generates a positive fit between the pin and the through-hole when tilted.

U.S. Pat. No. 4,244,666 also shows a tool holder and a cutting tool in which an indexable cutting insert may be clamped in a receiving pocket by means of a tiltable pin. The indexable cutting insert is merely clamped here by the pin, without a positive fit being produced.

The aim of the present invention is to further improve known tool holders and cutting tools having such tool holders. The tool holder should, in particular, enable quick and simple installation and removal of indexable cutting inserts. At the same time, precise and reliable positioning of the indexable cutting insert should be ensured.

The aim is achieved by means of a tool holder of the aforementioned type, in which the fastening pin is arranged on a fastening slide which is displaceably arranged in the tool holder base body. The fastening pin and the fastening slide are preferably integrally formed. The fastening slide, and thus the fastening pin, are thus moved from the mounting position into the clamping position. The same applies to the transition from the clamping position to the mounting position. This process can be repeated as often as required. Thus, indexable cutting inserts can be installed on, and removed from, the tool holder in an easy manner. The fastening needs to be moved by only a short distance, so that installation and removal can be carried out quickly. In addition, the fastening pin can always form surface contact with the indexable cutting insert to be mounted. At the same time, the fastening slide can form surface contact with the tool holder base body. This results in high precision during clamping of the indexable cutting insert. Furthermore, strong forces can be absorbed by the clamping mechanism, i.e., by the fastening pin, the fastening slide, and the tool holder. By means of the bearing structure, the indexable cutting inserts can also be precisely positioned on the tool holder. The bearing structure here may comprise a curved surface or at least two planar surfaces which are preferably not parallel. The tool holder consists of few parts and is thus constructed simply.

Preferably, the fastening slide is displaceable parallel to the base surface. The fastening pin thus also moves parallel to the base surface. During installation and removal of an indexable cutting insert, this effectively prevents tilting.

According to one embodiment, the fastening slide is slidable in a direction which encloses an angle of less than 90° with at least a portion of the bearing structure. The portion of the bearing structure may, for example, be a planar surface or a portion of a lateral surface of a circular cylinder. When an indexable cutting insert is mounted on the tool holder, it therefore includes a first movement component, which is perpendicular to the portion of the bearing structure, and a second movement component, which is parallel to the portion of the bearing structure. This allows achieving precise positioning of the indexable cutting insert against the bearing structure.

In a design alternative, the fastening pin is cylindrical and has a thickening of its diameter at its end facing away from the fastening slide. Cylindrical means that the fastening pin can take the form of any cylinder. Preferably, the base surface of the cylinder is a circular surface, and the fastening pin is thus circular-cylindrical. Due to the thickening of the diameter, the fastening pin has a mushroom shape overall. That is, a first portion of the fastening pin facing the fastening slide has a first diameter, and a second portion facing away from the fastening slide has a second diameter which is larger than the first diameter. The fastening pin comprises a step or bevel between the two portions. With this configuration of the fastening pin, reliable fastening of an indexable cutting insert to the tool holder is ensured.

The tool holder base body may comprise a guide groove, and the fastening slide may at least partially engage into the guide groove and be displaceable along the guide groove. The fastening slide is thus guided precisely and with repeatable accuracy in the tool holder main body. This results in an accurate positioning of the indexable cutting insert on the tool holder.

In one embodiment, the fastening slide is connected to the tool holder base body by means of a fastening bolt, and the fastening slide is preferably displaceable by tightening the fastening bolt. The fastening bolt is preferably accessible from a side surface of the tool holder. In the event that the fastening slide is coupled to the tool holder base body by means of a guide groove, the fastening slide can be moved along the guide groove by the bolt. This therefore provides a simple solution for positioning and moving the fastening slide precisely in the tool holder.

In an alternative embodiment, the fastening bolt is designed as a quick-fastening bolt or "speed screw." When the quick-fastening bolt is rotated by a predetermined angle, a larger stroke can be achieved compared to a conventional bolt. The stroke is understood here to mean a displacement distance of the fastening slide along the direction of the guide groove. The transition of the fastening slide from the mounting position into the clamping position, and vice versa, can thus be accelerated.

Advantageously, a central axis of the mounting bolt is arranged substantially perpendicular to a portion of the side surface.

In one construction variant, the fastening bolt passes through an opening in the fastening slide and cooperates with a thread in the tool holder base body, wherein the opening preferably has an oval cross-section. The head of the fastening bolt then abuts against the edge of the opening in the fastening slide. An oval design of the opening allows for displacement of the fastening slide transverse to the central axis of the fastening bolt. The fastening slide can thus be positioned on the tool holder base body in two directions perpendicular to one another, using a single fastening bolt.

Furthermore, the aim is achieved by a cutting tool of the aforementioned type, in which the indexable cutting insert is attached in the tool holder such that the indexable cutting insert base surface abuts against the base surface and the indexable cutting insert side surface abuts against the bearing structure, and the fastening pin is arranged in the fastening opening of the indexable cutting insert. The indexable cutting insert may be polygonal or round. If a round indexable cutting insert is used, the bearing structure comprises at least one portion of a lateral surface of a circular cylinder which corresponds to the rounded indexable cutting insert side surface. In the event that polygonal indexable cutting inserts are used, the bearing structure comprises at least two bearing surfaces corresponding to at least two of the indexable cutting insert side surfaces. The indexable cutting insert is thus precisely positioned in the cutting tool and held securely.

In a preferred embodiment, the fastening opening of the indexable cutting insert comprises a step and a thickening of the diameter of the fastening pin, such that the indexable cutting insert and the fastening pin are connected in a positive fit in the direction of a pin central axis. The indexable cutting insert is thus held securely in the cutting tool. It cannot be released even in the event of vibrations of the indexable cutting insert.

Alternatively, the fastening opening of the indexable cutting insert may be a through-hole, and a thickening of the diameter of the fastening pin can engage behind an edge of the fastening opening facing away from the tool holder base body such that the indexable cutting insert and the fastening pin are connected in a positive fit in the direction of a pin central axis. This also provides a secure attachment of the indexable cutting insert in the cutting tool, which is not released by vibrations of the indexable cutting insert.

The bearing structure and the end of the indexable cutting insert side surface can be free of undercuts in a direction perpendicular to the base surface. The bearing structure preferably serves exclusively for positioning the indexable cutting insert. This allows using indexable cutting inserts with variously designed indexable cutting insert side surfaces in the cutting tool. The cutting tool is universally usable in this respect and always ensures precise positioning of the indexable cutting insert.

In one variant, the end of the fastening pin which faces away from the fastening slide is flush with the indexable cutting insert. This achieves a compact design of the cutting tool. Moreover, it facilitates removal of the chips in the cutting process, since they do not encounter any projections or unevenness.

Advantageously, the indexable cutting insert is displaced in the direction of the bearing structure or away from the bearing structure by a displacement of the fastening slide by means of the fastening pin, wherein the indexable cutting insert base surface preferably glides on the base surface.

Figure 2:
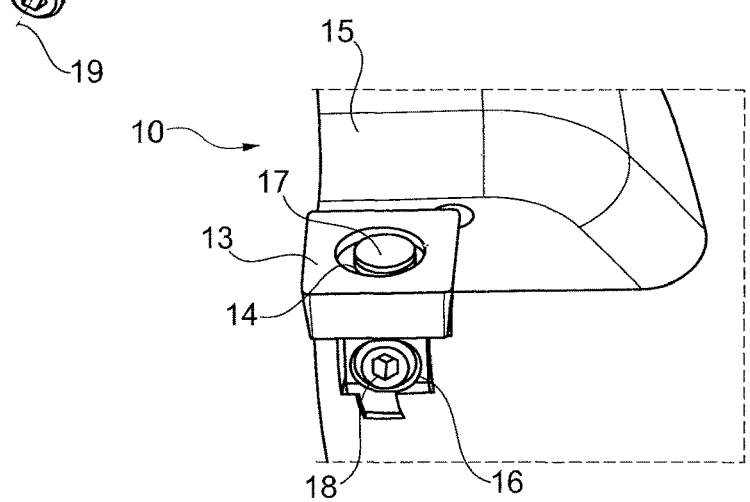
Figure 3:
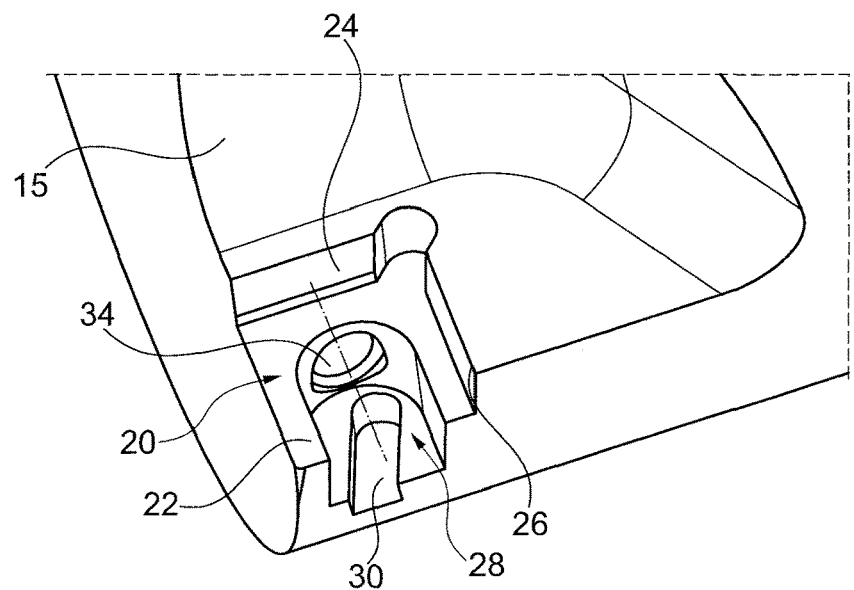
Figure 4:
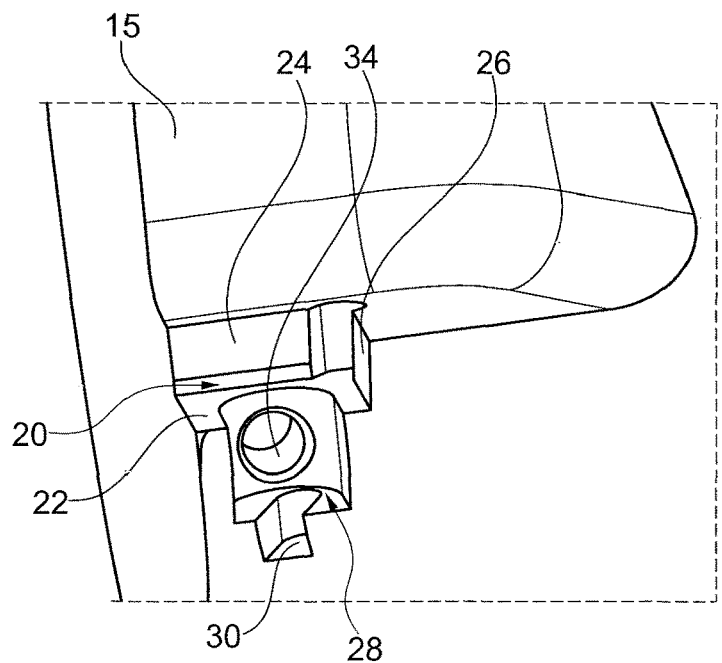
Figure 5:
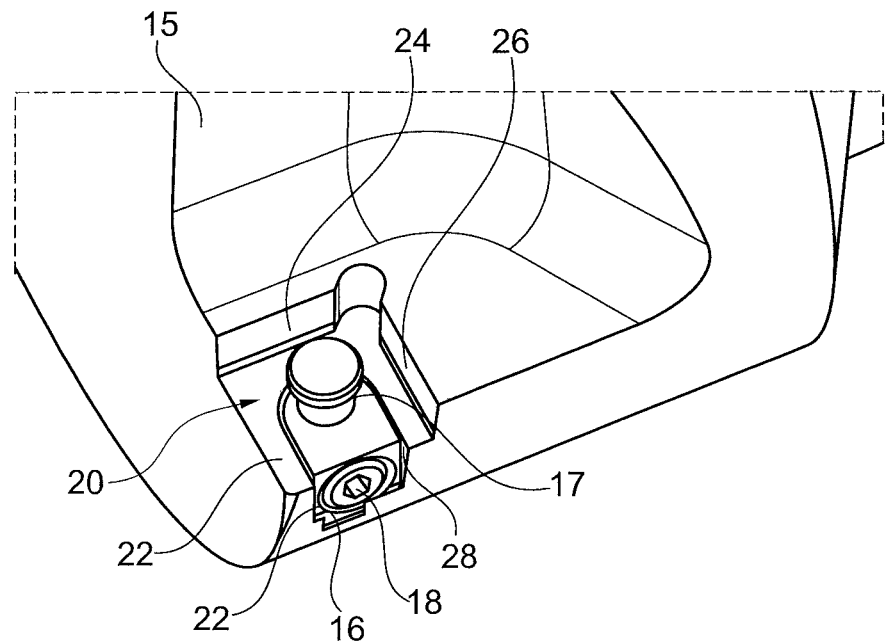
Figure 6:
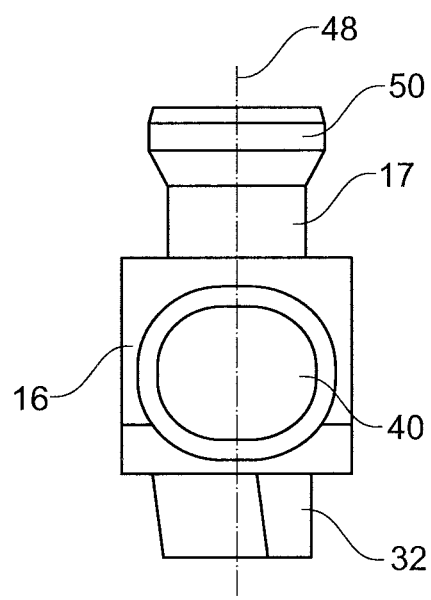
Figure 7:
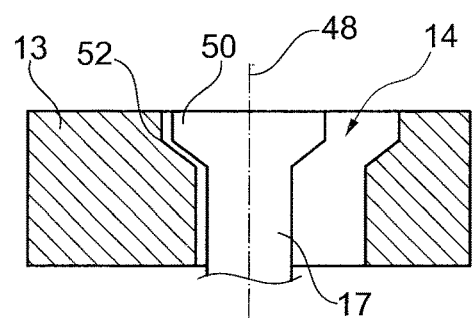
Figure 8:
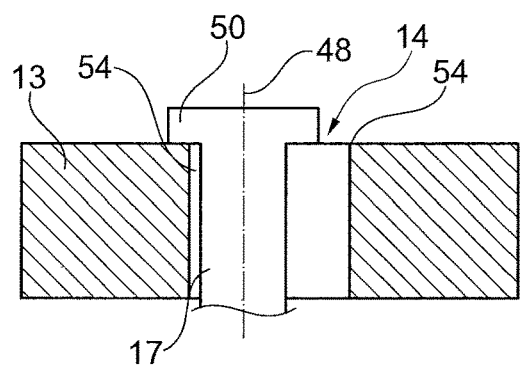
Figure 9:
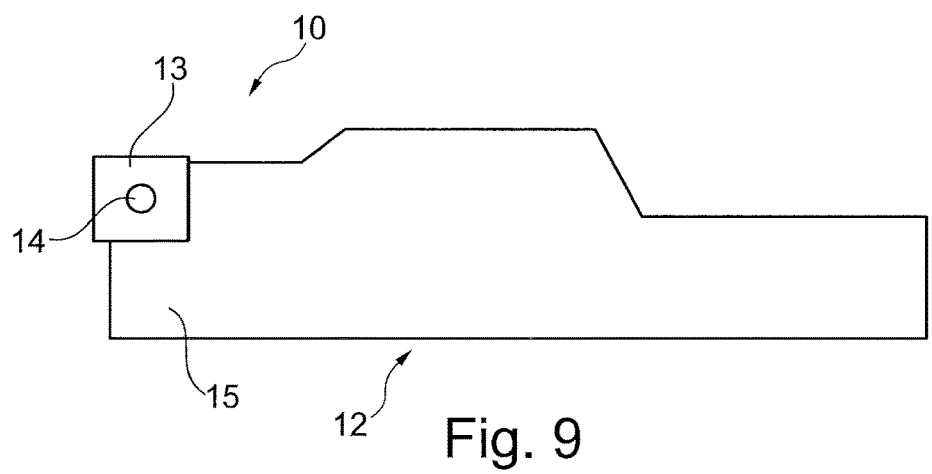

The invention will be explained below with reference to various exemplary embodiments, which are shown in the accompanying drawings. In the figures:

FIG. 1 shows a cutting tool according to the invention having a tool holder according to the invention in a perspectival exploded view, FIG. 2 shows the cutting tool according to the invention having the tool holder according to the invention from FIG. 1 in a perspective view, FIG. 3 shows a tool holder base body of the tool holder according to the invention in a perspectival view, FIG. 4 shows a tool holder base body of the tool holder according to the invention from FIG. 3 in another perspectival view, FIG. 5 shows the tool holder according to the invention in a perspectival view, FIG. 6 shows the fastening slide and the fastening pin of a tool holder according to the invention in a side view, FIG. 7 shows schematically the cooperation of a fastening pin of a tool holder according to the invention with an indexable cutting insert according to one embodiment, FIG. 8 shows schematically the cooperation of a fastening pin of a tool holder according to the invention with an indexable cutting insert according to another embodiment, and FIG. 9 shows a cutting tool according to the invention and a tool holder according to the invention in a schematic overview.

A cutting tool 10 comprises a tool holder 12 and an indexable cutting insert 13, having a central fastening opening 14, which is embodied as a through-hole in the illustrated exemplary embodiment.

The tool holder 12 comprises a tool holder base body 15, a fastening slide 16, on which a fastening pin 17 is arranged, and a fastening bolt 18, having an axial central axis 19, with which the fastening slide 16 can be fastened to the tool holder base body 15.

The shaft of the tool holder 12 is shown merely schematically and without any further designation.

A receiving pocket 20 for the indexable cutting insert 13 is provided in the tool holder base body 15. The receiving pocket 20 comprises a base surface 22, as well as a bearing structure which is formed from a first bearing surface 24 and a second bearing surface 26 in the illustrated embodiment.

In the embodiment shown, the receiving pocket 20 is open at the top and toward the two sides opposite the bearing surfaces 24 and 26.

A recess 28 for receiving the fastening slide 16 is provided in the base surface 22. The recess 28 is somewhat larger in size than the fastening slide 16.

A guide groove 30 is located at the bottom of the recess 28 into which groove the fastening slide 16 engages with a guide spring 32 formed thereon when it is mounted on the tool holder base body 15.

The guide groove 30 encloses an angle of less than 90° with the first bearing surface 24, as well as with the second bearing surface 26.

A hole with a thread 34 is also arranged in the tool holder base body 15. It extends substantially perpendicularly to the first bearing surface 24 and is designed such that the fastening bolt 18 can be screwed into it.

The fastening slide 16, the guide spring 32, and the fastening pin 17 are integrally formed. In addition, an opening 40 is arranged in the fastening slide 16, through which opening a shaft of the fastening bolt 18 can be inserted. A head of the fastening bolt 18 cannot be inserted through the opening 40. The cross-section of the opening 40 is oval (see FIG. 6).

The installation of the indexable cutting insert 13 on the tool holder 12 will be explained below.

Starting from the state of the cutting tool 10 shown in FIG. 1, the fastening slide 16 is first positioned in the recess 28. The guide spring 32, which is connected to the fastening slide 16, is arranged in the guide groove 30.

In addition, the shaft of the fastening bolt 18 is inserted through the opening 40 and screwed into the hole with the thread 34. Thus, the fastening slide 16 is connected to the tool holder base body 15. However, the fastening bolt 18 is not tightened yet.

The central axis 19 of the fastening bolt 18 then extends substantially perpendicularly to the first bearing surface 24.

The fastening slide 16 can thus only be displaced parallel to the base surface 22.

The state shown in FIG. 5 is obtained. In this state, the fastening slide 16, and thus the fastening pin 17, can be displaced manually along the guide groove 30.

The fastening pin 17, protruding from the base surface 22, and the fastening slide 16 then move with respect to the first bearing surface 24 and the second bearing surface 26 in a direction that encloses an angle of less than 90° with the first bearing surface 24 and the second bearing surface 26.

This position of the fastening pin 17 is the mounting position.

Next, the indexable cutting insert 13 is pushed onto the fastening pin 17. For this purpose, the fastening pin 17 passes through the fastening opening 14 of the indexable cutting insert 13, and the indexable cutting insert base surface 42 of the indexable cutting insert abuts with the base surface 22.

The end of the fastening pin 17 facing away from the fastening slide 16 is flush with the top side of the indexable cutting insert 13 (see FIG. 2).

The fastening bolt 18 is then tightened, i.e., screwed into the hole with the thread 34. The fastening slide 16 is pulled along the guide groove 30 toward the first bearing surface 24 and the second bearing surface 26.

The indexable cutting insert 42 can thereby glide on the base surface 22.

Thereby, a first indexable cutting insert side surface 44 of the indexable cutting insert 13 is placed against the first bearing surface 24, and a second indexable cutting insert side surface 46 of the indexable cutting insert 13 is placed against the second bearing surface 26.

In addition, the fastening pin 17 shifts within the mounting opening 14 transversely to its pin central axis 48. As can be seen in FIG. 6, the fastening pin is circular-cylindrical and comprises a thickening of its diameter 50 at its end facing away from the fastening slide 16.

This corresponds to a step 52 on the inner circumference of the fastening opening 14 of the indexable cutting insert 13. A positive fit between the fastening pin 17 and the indexable cutting insert 13 is thus produced in the direction of the pin central axis 48 (see FIG. 7).

FIG. 8 shows an alternative embodiment of the fastening pin 17 and the fastening opening 14. In this embodiment, the fastening opening 14 has a pure through-hole. The thickening of the diameter 50 of the fastening pin 17 then engages behind an edge 54 of the fastening opening 14 facing away from the tool holder base body 15.

In contrast to the aforementioned embodiment, the fastening pin 17 is no longer flush with the indexable cutting insert.

The remaining components remain unchanged with respect to the former embodiment.

As a result, the fastening pin 17 is in a clamping position, and the indexable cutting insert 13 is affixed and positioned on the tool holder 12 by abutting the base surface 22 with its indexable cutting insert base surface 42, abutting the first bearing surface 24 with its indexable cutting insert side surface 44, and abutting the second bearing surface 26 with its indexable cutting insert side surface 46 (see FIG. 2).

In this case, the indexable cutting insert side surfaces 44, 46 abut the bearing surfaces 24, 26 in a direction perpendicular to the base surface 22, without undercut.

To remove the indexable cutting insert 13 from the tool holder 12, the fastening bolt 18 is released.

For this purpose, the fastening bolt 18 does not have to be completely unscrewed from the hole with the thread 34. It is sufficient if the fastening bolt 18 is screwed out of the hole with the thread 34 far enough that the fastening slide 16 can be manually moved along the direction defined by the guide groove 30 away from the first bearing surface 24 and the second bearing surface 26, such that the positive fit between the indexable cutting insert 13 and the fastening pin 17 is released.

The fastening pin 17 is then again in the mounting position, and the indexable cutting insert 13 can be lifted off the tool holder 12 in the direction of the pin central axis 48.

The invention claimed is:

1. A tool holder for an indexable cutting insert, having a tool holder base body in which a receiving pocket, comprising a base surface and a bearing structure, is arranged for receiving an indexable cutting insert, and having a fastening pin protruding from the base surface and capable of assuming a mounting position and a clamping position, wherein, in the mounting position, the fastening pin may be positioned in a fastening opening of an indexable cutting insert and, in the clamping position, an indexable cutting insert may be affixed in the receiving pocket by means of the fastening pin, characterized in that the fastening pin is arranged on a fastening slide, displaceably arranged in the tool holder base body and secured to the tool holder base body via a fastening bolt passing through the fastening slide and engaging an aperture in a recess wall of the tool holder base body.

2. The tool holder according to claim 1, characterized in that the fastening slide is displaceable parallel to the base surface.

3. The tool holder according to claim 1, characterized in that the fastening pin is cylindrical and has a thickening of the diameter at its end facing away from the fastening slide.

4. The tool holder according to claim 1, characterized in that the tool holder base body comprises a guide groove, and the fastening slide at least partially engages in the guide groove and is displaceable along the guide groove.

5. The tool holder according to claim 1, characterized in that the fastening slide is connected to the tool holder base body by means of a fastening bolt, and the fastening slide is displaceable by tightening the fastening bolt.

6. The tool holder according to claim 5, characterized in that a central axis of the fastening bolt extends substantially perpendicularly to a portion of the bearing structure.

7. The tool holder according to claim 5, characterized in that the fastening bolt passes through an opening in the fastening slide and cooperates with a thread in the tool holder base body.

8. A cutting tool, having a tool holder according to claim 1 and an indexable cutting insert with an indexable cutting insert base surface and an indexable cutting insert side surface, characterized in that the indexable cutting insert is fastened in the tool holder such that the indexable cutting insert base surface abuts the base surface and the indexable cutting insert side surface abuts the bearing structure, and the fastening pin is arranged in the fastening opening of the indexable cutting insert.

9. The cutting tool according to claim 8, characterized in that the fastening opening of the indexable cutting insert comprises a step, and a thickening of the diameter of the fastening pin engages behind the step such that the indexable cutting insert and the fastening pin are connected in a positive fit in the direction of a pin central axis.

10. The cutting tool according to claim 8, characterized in that the fastening opening of the indexable cutting insert is a through-hole, and a thickening of the diameter of the fastening pin engages behind an edge, facing away from the tool holder base body, of the fastening opening such that the indexable cutting insert and the fastening pin are connected in a positive fit in the direction of a pin central axis.

11. The cutting tool according to claim 8, characterized in that the bearing structure and the indexable cutting insert side surface are free of undercuts in a direction perpendicular to the base surface.

12. The cutting tool according to of claim 8, characterized in that the end, facing away from the fastening slide, of the fastening pin is flush with the indexable cutting insert.

13. The cutting tool according to claim 8, characterized in that the indexable cutting insert is displaced in the direction of the bearing structure or away from the bearing structure by a displacement of the fastening slide by means of the fastening pin.

14. A tool holder for an indexable cutting insert, having a tool holder base body in which a receiving pocket, comprising a base surface and a bearing structure, is arranged for receiving an indexable cutting insert, and having a fastening pin protruding from the base surface and capable of assuming a mounting position and a clamping position, wherein, in the mounting position, the fastening pin may be positioned in a fastening opening of an indexable cutting insert and, in the clamping position, an indexable cutting insert may be affixed in the receiving pocket by means of the fastening pin, characterized in that the fastening pin is arranged on a fastening slide, the fastening slide arranged in the tool holder base body and displaceable parallel to the base surface via a fastening bolt passing through the fastening slide.

15. The tool holder according to claim 14, wherein a tip of the fastening bolt threadingly engages an aperture in a recess wall of the tool holder base body.

* * * * *